UNITED STATES PATENT OFFICE.

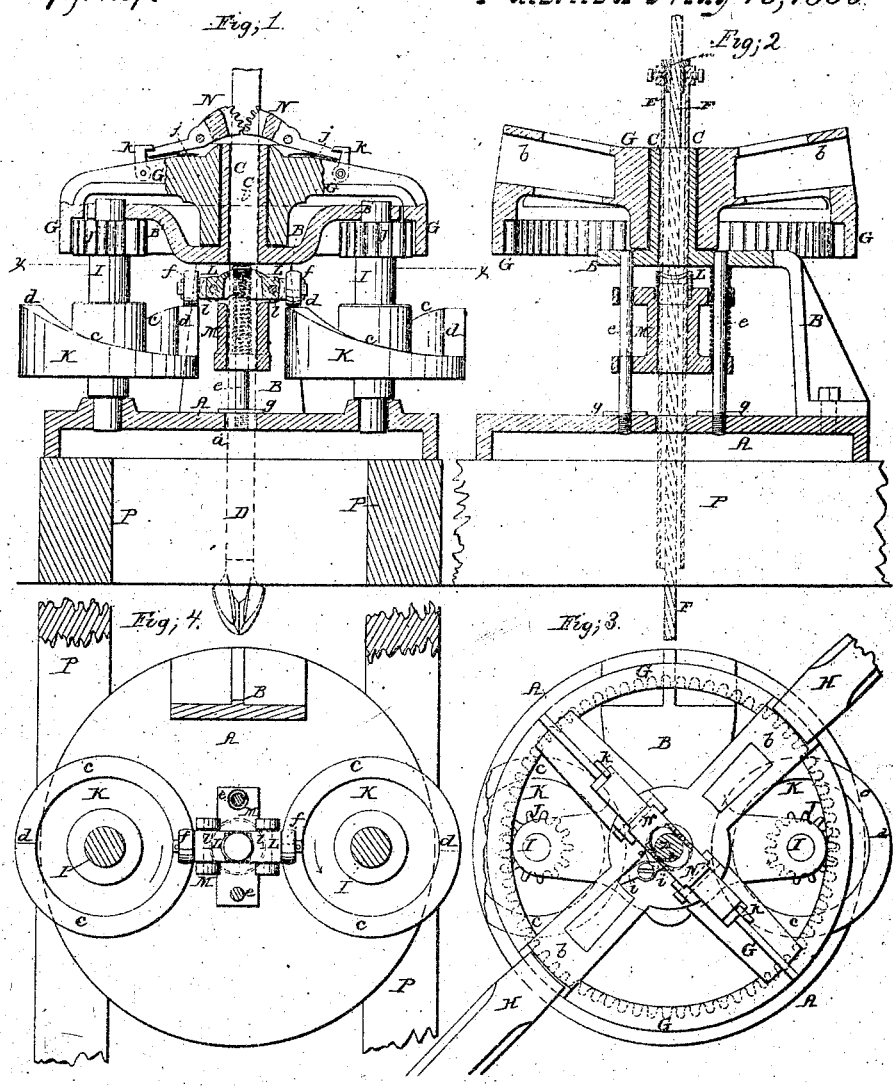

LAWRENCE HOLMS, OF PATERSON, NEW JERSEY.

IMPROVEMENT IN BORING WELLS.

Specification forming part of Letters Patent No. 47,724, dated May 16, 1865.

*To all whom it may concern:*

Be it known that I, LAWRENCE HOLMS, of Paterson, in the county of Passaic and State of New Jersey, have invented a new and improved machine for drilling and boring oil-wells and for other drilling and boring operations of a similar nature, also applicable to the working of pumps; and I do hereby declare that the following is a full, clear, and exact description of the same, reference being had to the accompanying drawings, forming part of this specification, in which—

Figures 1 and 2 are central vertical sections of the machine, taken at right angles to each other. Fig. 3 is a plan of the same. Fig. 4 is a horizontal section of the same in the plane indicated by the line $x$ $x$ in Fig. 1.

Similar letters of reference indicate corresponding parts in the several figures.

One important object of this invention is to provide for the use in the same machine of either drills or augers, according to the varying character of the strata to be penetrated in drilling and boring wells and other drilling and boring operations in the earth's crust. Another important object is to provide for the operation of drilling with a drill or tool, whose principal movement is a jumping or longitudinal one, by means of horse-power or of other power applied in a horizontal circle described around the axis of the bore; and a further important object is to afford equal facility for the application of the power to the drill bar or rod either directly or through the medium of a rope.

To accomplish these and other desirable results—among which may be mentioned the use of the drilling and boring machine to work a pump—my invention consists in a machine the principal characteristic of which, as distinguished from other machines for similar purposes, is that its driving gear rotates about and its working parts are arranged around a central hollow shaft concentric and parallel with the axis of the drilling or boring tool, and the interior of which may be considered as a neutral or dead center of the machine.

To enable others skilled in the art to make and use my invention, I will proceed to describe its construction and operation.

A is a bed-plate, on which is erected a crane or other shaped standard, B, to the upper part of which is cast or otherwise firmly secured the hollow upright shaft or axle C, situated over the center of the bed-plate, the interior of the said shaft being just large enough for the free passage through it of the cylindrical drill bar or rod D, (represented in red outline in Figs. 1 and 3,) and of the tube E, (represented in section in red color in Fig. 2,) by which the suspending-rope F of the drill is held when a rope is used for the suspension of the drilling-tool. In the center of the bed-plate there is a hole, $a$, which, like the interior of the shaft or axle C, is just large enough for the passage of the drill bar or rod or the aforesaid tube, and which serves as an additional guide to the said bar, rod, or tube in the drilling or boring operation.

G is an internally-toothed cog-wheel, which is bored centrally to fit and rotate freely upon the shaft C, and which is supported upon the standard B. This wheel, which is the driving-wheel of the machine, is constructed or provided with hollow sockets $d$ $d$, for the reception of radially-arranged beams or bars H H, (shown broken off in Fig. 3,) to which to harness horses or other animals or apply the power of men to give rotary motion to the said wheel by walking in a circular path around the shaft C. Rotary motion may, however, be given to the said wheel by means of steam or other power; but one great object of my invention is to apply the power of horses to the purpose of drilling and boring.

I I are two upright shafts, the axes of which are at equal distances from the axis of the shaft C, on opposite sides thereof, their lower journals being received in fixed bearings in the bed-plate A, and their upper ones in fixed bearings in arms B' B', provided on or attached to the upper part of the standard B. To the upper parts of these shafts I I there are secured pinions J J, of equal size, which gear with the internally-toothed cog-wheel G, and through which rotary motion is imparted at equal velocities to the two shafts I I by the rotation of the larger cog-wheel, G. The said shafts I I have also secured firmly upon them, one upon each, two similar circular cams, K K, the upper sides of which are each formed with one or more spiral surfaces or circular inclined planes $c$ $c$, terminating abruptly in upright steps $d$ $d$, the purpose of the said cams being to operate upon the pair of grippers L L in such manner as first to make them grip and lift the drill-bar D or tube E and the drilling-tool, and afterward to suddenly release the said bar or tube and let the tool drop.

The grippers L L are substantially like those used in many well-known rock-drilling machines, and are pivoted by pins $l\ l$ to a sleeve, M, which is fitted to the bar D or tube E in such manner as to permit the said bar or tube to slide and turn easily within it, but which is prevented from turning by means of two fixed guide-rods, $e\ e$, between the bed-plate and the top of the standard. The outer ends of the grippers are furnished with anti-friction rollers $f\ f$, to reduce the friction produced by the operation of the cams, and the said ends with the friction-rollers are heavier than the inner ends or jaws of the grippers, which seize the drill-bar D or tube E, so that the grippers may open by their own weight when not closed by the upward pressure of the cams on the anti-friction rollers. Under the sleeve M there are cushions $g\ g$, of india-rubber or other soft material, for the said sleeve to drop upon and to reduce the jar of the sleeve and grippers when they fall on the abrupt steps of the cams passing the antifriction rollers in their revolution. The said cushions are so arranged that they stop the fall of the sleeve at such a height as to allow the grippers to open when the anti friction rollers slip over the steps of the cams.

The drill-bar D and tube E have each a longitudinal groove, $h$, Fig. 3, for the reception of the point of a horizontally-operating spring pawl, $i$, Fig. 3, attached to the top of the driving-wheel G, for the purpose of producing the necessary rotary motion of the drill or boring tool.

To the top of the driving-wheel G there are attached a pair of gripers, N N, substantially like L L, except that they have no anti-friction rollers, and have springs $j\ j$ applied to their outer ends for the purpose of closing them upon the rod D or tube E in such manner as to prevent the said bar or tube from descending, but so as to permit them to be opened by the friction of the bar or tube within them when it is drawn upward. These grippers are, however, only to be used while the drill or boring-tool is being drawn out from the bore, for the purpose of preventing its descent after it has been partly withdrawn and while preparing to take a new hold upon it. At all other times the said grippers are held out of contact with the bar or tube by means of hooked catches $k\ k$, applied to their outer ends.

When the machine is to be set in operation, the bed-plate is placed upon and may be bolted to heavy sills P P, of timber, or upon any other suitable foundation, and the rod or bar D of the drill or boring-tool is inserted through the hollow fixed shaft C and the hole $a$ in the bed-plate.

I will first suppose the operation to be performed to be that of drilling through a hard stratum, in which the tool is required to have a jumping motion.

A comparatively slow rotary motion of the driving-wheel G produces through the pinions J J a rapid rotary motion of the shafts I I and cams K K, and the latter, by their rotation, acting together, cause the grippers L L to seize, lift, and drop the bar or rod D once or more times during every revolution, according to the number of inclined planes $c\ c$ and steps $d\ d$ provided on their upper surfaces, thereby producing a rapid jumping motion of the drill, while a slow rotary motion is imparted to it by the pawl $i$, which, acting in its groove $h$, causes it to turn once in every revolution of the driving-wheel. This operation is proceeded with until the drilling has progressed to such a depth that the upper end of the rod or bar D has descended to or nearly the level of the pawl $i$, when another length is added to the rod or bar, or the rope $m$ is passed through the tube E and attached to the upper end of the rod or bar and the said tube inserted through the shaft C down to the top of the bar, and secured to the rope by a screw-clamp, $n$, fitted into its upper end. The drilling is then proceeded with as before, the grippers L L and the pawl $i$, after the rod or bar has passed them, acting in the same manner upon the said tube as they previously did upon the rod or bar, and so jumping and turning the drill by means of the rope. When the upper end of the tube has arrived at or nearly at the pawl, the clamp $m$ is unscrewed or loosened, and the tube raised to bring its lowest part within the grippers L L, and again secured to the rope, and the operation again proceeded with in the same manner, the tube being liberated from the rope, raised up, and secured again as often as necessary during the progress of the work.

It will be necessary from time to time as the work progresses with the rope to allow the rope to relieve itself of the excessive twist which is given to it by turning the tube, and for this purpose the pawl $i$ is use instead of a fixed pin or feather to turn it. By pressing back the pawl while the grippers are over the lowest parts of the inclined planes $c\ c$, and the tube is consequently free from them, the said tube is free to turn, and permit the rope to turn in the opposite direction to that in which has been turned in the drilling operation until the excessive twist has expended itself.

When it is desired to bore through a soft stratum, for which the jumping movement of the tool is unnecessary, and for which an auger or tool having a simple rotary motion can be used, the sleeve M is raised and propped up to such a height that the cams in their revolution will not close the grippers upon the bar or rod D, and the said bar or rod will then have only the rotary motion which is imparted to it by the pawl as the driving-wheel rotates.

In the drilling operation first described the lift of the drill may be regulated by placing, higher or lower, cushions or stops $g$ $g$ under the sleeve. A higher stop, not permitting the sleeve and grippers to drop so low, prevents them from being lifted so great a distance, and a lower stop having an opposite effect.

It is obvious that, by inserting a pump-rod in place of the rod or bar D, or tube E, a pump may be worked by the machine, provided the weight of the plunger and rod be sufficient to produce its downward stroke.

It will be understood that, by the arrangement of all the parts of the machine around a hollow central shaft, around which the driving-gear rotates, and which is concentric and parallel with the axis of the drilling or boring tool, so that the rod or bar or tube to which the said tool is attached may pass through it, or, in other words, so that the interior of the said shaft forms a neutral or dead center to the machine, the operation of drilling with a jumping motion may be performed by horse or other power, applied in a circle surrounding the said shaft, axis, or center, and either the above-mentioned operation of drilling or the operation of boring without a jumping motion may be performed by one machine.

Having thus described my invention, I will proceed to state what I claim as new and desire to secure by Letters Patent.

1. In a machine for drilling oil-wells or other drilling operations, in which a jumping motion is given to the drill, so arranging and applying the driving-wheel or other wheel or device through which power is applied to produce the jumping motion that it rotates about a hollow shaft or axle through which the drill-rod passes, substantially as herein described.

2. The combination of the sleeve M, or its equivalent, fitted to slide upon the drill rod or bar D or the tube E, from which it is suspended, the grippers L L, the shafts I I, and the cams K K, the whole arranged and operating substantially as herein described.

3. The employment, for lifting and jumping the drill or boring-tool by means of a rope and grippers, of a tube, E, clamped to the rope, but adjustable lengthwise thereon, as the tool descends, substantially as herein specified.

4. In combination with the longitudinal groove $h$ in the tube E, from which the drill or boring tool is suspended by a rope, a pawl, $i$, so applied to the driving-wheel G or other device from which the rotary motion of the tool is obtained as to provide for the release of the said rod, bar, or tube, to allow the rope to relieve itself or be relieved of excessive twist, substantially as herein described.

5. The combination of the hollow central shaft, C, internally-toothed driving-wheel G, shafts I I, pinions J J, cams K K, sleeve M, or its equivalent, and grippers L L, the whole arranged and operating substantially as and for the purpose herein specified.

6. The arrangement of the standard B, the fixed hollow upright shaft C, through which the drill-rod passes, and driving-wheel G, substantially as herein described, whereby a clear space is left all around the said wheel to permit it to be operated by means of beams or capstan-bars, as herein set forth.

LAWRENCE HOLMS.

Witnesses:
J. W. COOMBS,
G. W. REED.